United States Patent [19]

Maki

[11] Patent Number: 5,323,163

[45] Date of Patent: Jun. 21, 1994

[54] ALL DOP GPS OPTIMIZATION

[76] Inventor: Stanley C. Maki, 4966 - A Waring Rd., San Diego, Calif. 92120-2734

[21] Appl. No.: 9,093

[22] Filed: Jan. 26, 1993

[51] Int. Cl.⁵ .......................................... G01S 13/00
[52] U.S. Cl. ................................................. 342/357
[58] Field of Search ....................... 342/357, 352, 356

[56] References Cited

U.S. PATENT DOCUMENTS 5,144,318 9/1992 Kishi .................................. 342/357

Primary Examiner—Mark Hellner
Attorney, Agent, or Firm—Frank D. Gilliam

[57] ABSTRACT

The all DOP GPS optimization utilizes special dilution of precision (DOP) minimization measures to select the constellation of four (and fewer, with constraints) GPS satellites to form the navigation solution with optimized accuracy in the desired orthogonal component(s) of position and velocity, and the desired component of time. Furthermore, the all DOP GPS optimization utilizes multiple navigation solutions of the top ranked satellite constellations of four (and fewer) GPS satellites selected by special DOP(s) (and standard DOP(s)) minimization(s), by weighting these multiple navigation solution estimates for a component(s) of interest with the inverse of the associated DOP, and then solving for the least squares solution of these multiple navigation solution estimates. Implementation of all DOP GPS optimization is accomplished with addition of microprocessor(s), RAM memory, and ROM memory to the general processing section of a GPS receiver to implement the special DOP (and standard DOP) algorithms, the multiple parallel running navigation solutions, and the least squares solution of the the multiple navigation solution estimates by increased processing thruput, and added data, constants, and instructions storage.

19 Claims, 4 Drawing Sheets

TDOP COMPUTATION $(TDOP)^2 (\det H)^2$
$\begin{aligned}
&= (1_1 \cdot (1_2 \times 1_3))^2 + (1_2 \cdot (1_3 \times 1_4))^2 \\
&\quad + (1_3 \cdot (1_4 \times 1_1))^2 + (1_4 \cdot (1_1 \times 1_2))^2 \\
&= (D_{k=a,i=b,j=c})^2 + (D_{k=b,i=c,j=d})^2 \\
&\quad + (D_{k=c,i=d,j=a})^2 + (ED_{k=d,i=a,j=b})^2
\end{aligned}$ Utilize the $D_{k,i,j}$ and $D_{k,j,i}$ and $ED_{k,i,j}$ values computed and stored for determinant of H computation.

VDOP COMPUTATION $\begin{aligned}
(VDOP)^2 (\det H)^2 &= 2(X_{z\,a,b})(+X_{z\,a,b} - X_{z\,a,c} + X_{z\,b,c} + X_{z\,b,d}) + 2(X_{z\,a,c})^2 \\
&\quad - 2(X_{z\,b,c})(-X_{z\,a,c} + X_{z\,b,c} - X_{z\,b,d} + X_{z\,c,d}) + 2(X_{z\,b,d})^2 \\
&\quad + 2(X_{z\,c,d})(+X_{z\,a,c} - X_{z\,b,d} + X_{z\,c,d} + X_{z\,d,a}) \\
&\quad + 2(X_{z\,d,a})(+X_{z\,a,b} + X_{z\,a,c} - X_{z\,b,d} + X_{z\,d,a})
\end{aligned}$ where $X_{z\,a,b}$ is the $1_z$ component of $X_{i=a,j=b}$
or $X_{z\,a,b} = 1_aX 1_bY - 1_bX 1_aY$ and so forth,
and $X_{z\,d,a}$ is the $1_z$ component of $X_{j=d,i=a}$
or $X_{z\,d,a} = 1_dX 1_aY - 1_dY 1_aX$.

Utilize the $X_{i,j}$ and $X_{j,i}$ $1_z$ component values computed and stored for determinant of H computation.

ODOP COMPUTATION
(LOngitude Dilution of Precision)

AXIS DEFINITIONS
Local Geodetic
  X axis east
  Y axis north    } R. Grover Brown convention
  Z axis up $\begin{aligned}
(ODOP)^2 (\det H)^2 &= 2(X_{x\,a,b})(+X_{x\,a,b} - X_{x\,a,c} + X_{x\,b,c} + X_{x\,b,d}) + 2(X_{x\,a,c})^2 \\
&\quad + 2(X_{x\,b,c})(-X_{x\,a,c} + X_{x\,b,c} - X_{x\,b,d} + X_{x\,c,d}) + 2(X_{x\,b,d})^2 \\
&\quad + 2(X_{x\,c,d})(+X_{x\,a,c} - X_{x\,b,d} + X_{x\,c,d} + X_{x\,d,a}) \\
&\quad + 2(X_{x\,d,a})(+X_{x\,a,b} + X_{x\,a,c} + X_{x\,b,d} + X_{x\,d,a})
\end{aligned}$ where $X_{x\,a,b}$ is the $1_x$ component of $X_{i=a,j=b}$
or $X_{x\,a,b} = 1_aY 1_bZ - 1_bY 1_aZ$ and so forth,
and $X_{x\,d,a}$ is the $1_x$ component of $X_{j=d,i=a}$
or $X_{x\,d,a} = 1_dY 1_aZ - 1_aY 1_dZ$.

Utilize the $X_{i,j}$ and $X_{j,i}$ $1_x$ component values computed and stored for determinant of H computation.

FIGURE 7

$$Z_T - Z_m = \Delta Z_m \sim VDOP_m$$

$$Z_T - Z_{m-1} = \Delta Z_{m-1} \sim VDOP_{m-1}$$

$$Z_T - Z_{m-2} = \Delta Z_{m-2} \sim VDOP_{m-2}$$

$$Z_T - Z_{m-3} = \Delta Z_{m-3} \sim VDOP_{m-3}$$

$$Z_T - Z_{m-4} = \Delta Z_{m-4} \sim VDOP_{m-4}$$

and $$\text{Min } Z_T = \left[\left(\frac{\Delta Z_m}{VDOP_m}\right)^2 + \left(\frac{\Delta Z_{m-1}}{VDOP_{m-1}}\right)^2 + \left(\frac{\Delta Z_{m-2}}{VDOP_{m-2}}\right)^2 + \left(\frac{\Delta Z_{m-3}}{VDOP_{m-3}}\right)^2 + \ldots\right]^{1/2}$$

where $\min Z \leq Z_T \leq \max Z$

FIGURE 8

ALL DOP GPS OPTIMIZATION

BACKGROUND OF THE INVENTION

The present invention relates generally to navigation by satellite, GPS and GLONASS, and more specifically but not by way of limitation, to a novel method and arrangement to maximize the accuracy of the navigation coordinates of interest, position, velocity, and time.

Currently and in the past, GPS (and GLONASS) users select the four satellites from those in view of the user; to solve for the three orthogonal components of position and velocity, and the time component based on the minimization of the value of the position dilution of precision (PDOP), horizontal dilution of precision (HDOP) or geometrical dilution of precision (GDOP). The geometric arrangement of the selected four satellites (and fewer under constraints such as operating at sea level) satellites degrades the basic solution accuracy which would be attainable with an ideal geometric arrangement of the four satellites. This is termed the dilution of precision (DOP).

Terminology for the common DOP measures include:
GDOP: Geometric Dilution of Precision, related to 3 spatial coordinates and time
PDOP: Position Dilution of Precision, related to 3 spatial coordinates
HDOP: Horizontal Dilution of Precision, related to the 2 horizontal spatial coordinates
VDOP: Vertical Dilution of Precision, related to the vertical spatial coordinate
TDOP: Time Dilution of Precision, related to the time component.

The standard method of minimizing PDOP, HDOP or GDOP provides for selecting the best to select the four satellites for pseudo ranging, and then solving for three spatial components and time provides good general accuracy from only four satellites. The standard method does not specialize the DOP measure to maximize the accuracy available, nor does it use the additional information from satellites other than the best four selected.

The object of this invention then is to maximize the accuracy of the component(s) of interest to the GPS (and GLONASS) user; firstly by specializing the DOP to the component of interest, so as to select the group of four (and under some constraints, fewer) visible satellites which provides the greatest measurement accuracy for that component; and secondly, by using the specialized DOP measure to select lower top ranked multiple groups of four satellites, estimate the value of the component of interest for each of these top ranked groups, weight these estimates, and then combine these weighted estimates in a least squares solution for maximum accuracy.

This invention reduces the effects of error sources such as multi-path, random noise, and time bias which exist to a larger extent in current systems, by using the inherent averaging from the least squares solution of the weighted estimates from multiple satellite groups. This invention reduces the error due to dilution of precision by using the DOP measure specialized to the component of interest.

This invention is applicable to the navigation of any object including, for example, a wide range of vehicles; automobiles, trucks, marine vessels, aircraft, snowmobiles, tractors, motorcycles; basically any vehicle that moves under human control, and has access to the GPS (and GLONASS) RF signals; as well as non-vehicular carriers. Some specific applications of this invention, of particular interest, include altitude and lateral runway distance for aircraft and space return vehicles landing under instrument conditions; and marine position location for ship traversing in narrow shipping and harbor lanes.

SUMMARY OF THE INVENTION

Briefly stated, the present invention contemplates a novel method of arranging for utilizing GPS and GLONASS radio signals to improve the accuracy attainable to the user in position, velocity, and time. More specifically, another object of the invention is to provide a novel the method and arrangement of digital signal processing on the digitized pseudo ranges from the user to the GPS (and GLONASS) satellites, that have been derived from the GPS (and GLONASS) radio signals, to improve the accuracy of the navigation coordinates attainable to the user in position, velocity, and time.

In addition to computing the PDOP, HDOP, or GDOP for the combinations of four visible satellites, and then selecting the combination with the lowest PDOP, HDOP, or GDOP, as is commonly done; this invention proposes to compute the specialized dilution of precision for improving accuracy of specific components. For purposes of this invention, some of these special dilution of precision and the related components are defined as:

| Time Dilution of Precision | TDOP | Time bias component |
| Vertical Dilution of Precision | VDOP | Height component |
| LAtitude Dilution of Precision | ADOP | Latitude component |
| LOngitude Dilution of Precision | ODOP | Longitude component |
| Directional Dilution of Precision; (e.g., runway centerline, ship channel) | DDOP | Directional component |
| Lateral Dilution of Precision; (e.g., crosswise to runway, crosswise to ship channel) | LDOP | Lateral component |

For those components for which greater accuracy is desired than that afforded by PDOP, HDOP, or GDOP minimization, the satellite sets of four combinations to be used for estimating those components are selected based on minimizing the related special dilution of precision.

A simulation using the present invention has been conducted for a user located at N-32°49′36.45″ latitude and W-117°08′16.25″ longitude with the 21 GPS satellite constellation for a 24 hour time span with the following results:

| | Simulation All DOP GPS Optimization Comparison | | | | | |
|---|---|---|---|---|---|---|
| | Percentage Time Uses | Used Different Set of Satellites From PDOP Optimization | | | | |
| | Same Set of Satellites as | | Percentage Penalty for Using PDOP | | | |
| DOP* | PDOP | Percentage | Optimization Only | | | |
| Minimization | Optimization | Time | Ave | Max | Min | Comments |
| TDOPm | 47.1 | 52.9 | 8.18 | 39.34 | Near Zero | A general measure like PDOP so less improvement |
| VDOPm | 9.9 | 90.1 | 36.17 | 261.60 | Near Zero | A significant improvement for altitude measure. |
| ODOPm | 25.6 | 74.4 | 47.91 | 401.95 | Near Zero | Also a significant improvement. |
| ADOPm | 35.5 | 64.5 | 37.47 | 196.82 | Near Zero | Probably less improvement than with ODOP because of better satellite spatial distribution in longitude than latitude. |

*All satellite combinations checked for up to and including 11 satellites in view.

It can be noted that substantial improvement can be expected for applying special dilution of precision selection of the combination(s) of four visible satellites.

This invention affords further improvement by providing multiple estimates of the components of interest from solutions of the top ranked sets of four visible satellites that minimize the special dilution of precision. Typically a single Kalman filter provides a single solution or the best set of four satellites. This invention includes the use of multiple Kalman filters, each operating on the data of one of the selected visible satellite sets of four, to provide multiple estimates of the component of interest.

Since the accuracy of each estimate from a set of four satellites is directly related to its dilution of precision, each of the multiple estimates will be weighted by the inverse of its dilution of precision. A least squares solution of these weighted multiple solutions is then formed. Due to the averaging effect of this least squares solution processing involving multiple satellite sets of four (and numerous satellites), random noise errors are reduced. Multi-path error is reduced with use of numerous satellites, each with its own angle of incidence on multi-path structures; and each satellite combination having its own unique phasing and amplitude of multi-path signals. Thus, the multi-path error also tends to cancel and average out.

An additional advantage of the least squares processing portion is that it is computationally simple, and does not introduce any additional filtering time lag. An additional advantage of the special dilution of precision and multiple Kalman filter processing portion is that it is mostly replication of existing software except for unique special dilution of precision computation.

Another system advantage is that with use of numerous satellites, the undetected degradation of one satellite will not have as large as impact on the final solution, as it would if it were one of the four satellites in a single solution.

Another system advantage is that the invention can be applied to a variety of signal processing receivers, including, but not limited to, parallel, sequential, code, code plus carrier, C/A code, P code, inertial integrated, combined GPS and GLONASS, dual frequency codeless, and Y code correlation.

Another advantage of this invention is that multiple satellite constellations and associated Kalman filters can be implemented to provide greater accuracy with the more general DOPs (PDOP, HDOP, GDOP) using the weighted multiple Kalman estimates in the least squares solution.

These and other advantages of the present invention will become apparent to those skilled in the art by reference to the following detailed description with the appended claims, when considered in conjunction with the accompanying drawings.

BRIEF DESCRIPTION OF THE DRAWINGS

FIG. 7 is a table of the basic computational algorithms for the time dilution of precision, vertical dilution of precision, and longitude dilution of precision.

FIG. 8 is a table of the algorithms for the example of the least squares solution of the multiple estimates of the vertical position component.

DESCRIPTION OF THE PREFERRED EMBODIMENT

Figure 1:
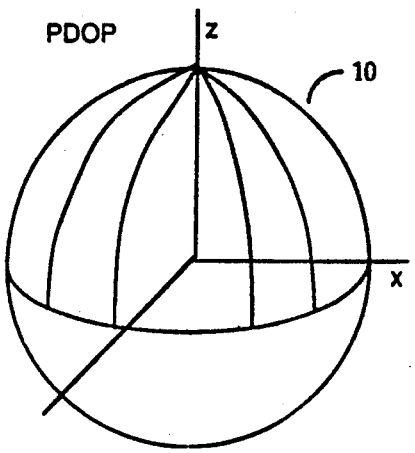
FIG. 1 is a pictorial representation of the error volume representing the position dilution of precision (PDOP), and the error reduction in the three position components.
Figure 2:
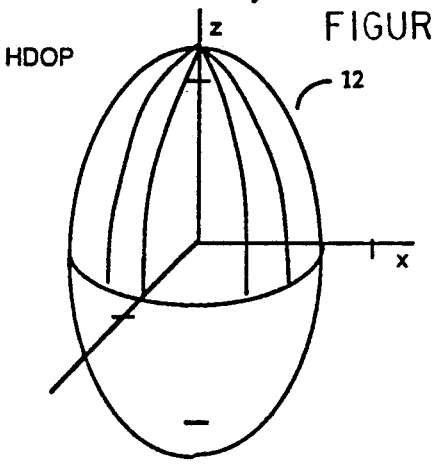
FIG. 2 is a pictorial representation of the error volume representing the horizontal dilution of precision (HDOP), and the error reduction in the horizontal x and y coordinates, accompanied by an increased error in the vertical coordinate.
Figure 3:
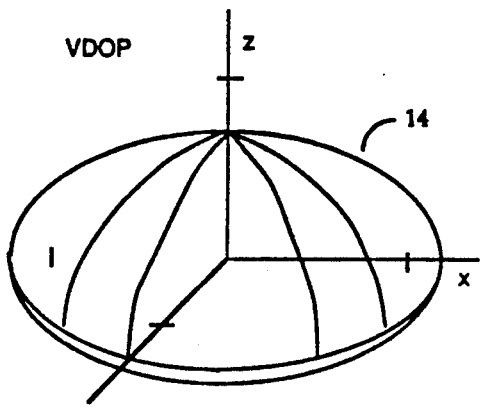
FIG. 3 is a pictorial representation of the error volume representing the vertical dilution of precision (VDOP), and the error reduction in the vertical z coordinate (height and altitude), accompanied by an increased error in the x and y components.
Figure 4:
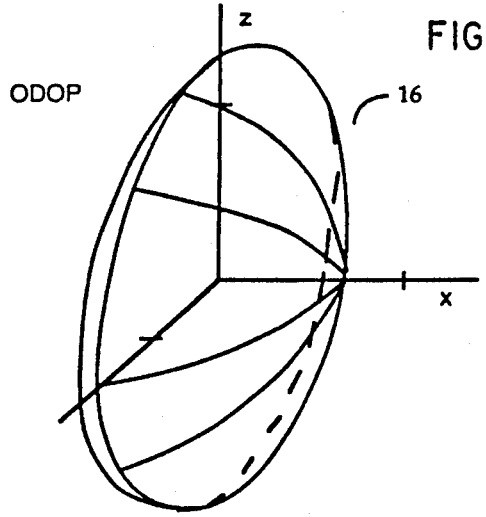
FIG. 4 is a pictorial representation of the error volume representing the longitude dilution of precision (ODOP), and the error reduction in the horizontal x component (longitude), accompanied by an increased error in the horizontal y and vertical z components.
Figure 5:
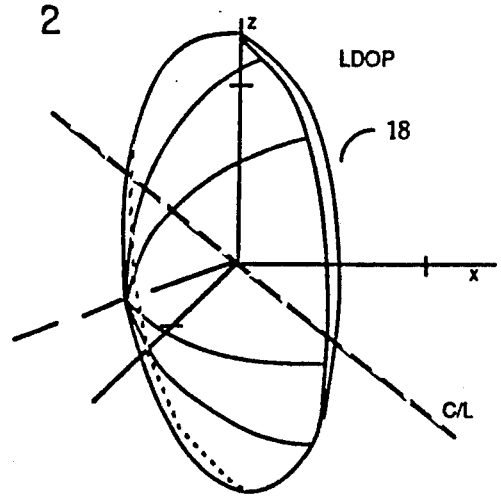
FIG. 5 is a pictorial representation of the error volume representing the lateral dilution of precision (LDOP) with respect to a runway center line, and the error reduction in the lateral horizontal component perpendicular to the runway center line, accompanied by increased errors in the horizontal component along the runway center line and the vertical z component.

Referring now to the drawings in detail, and in particular to FIG. 1, reference character 10 illustrates the error volume of the position dilution of precision (PDOP) in equalizing the errors along the z vertical axis, and the horizontal x and y axis. In FIG. 2, reference character illustrates the error volume for another component commonly accepted for minimization purposes horizontal dilution of precision (HDOP). It promotes increased accuracy in the horizontal components at the expense of increased vertical error. In FIG. 3, the vertical dilution of precision (VDOP) error volume 14 is a special DOP of the vertical component and therefore is of great importance to users such as aircraft instrumented landings for altitude accuracy improvement. In FIG. 5 the ODOP (LOngitude Dilution of Precision) error volume 16 emphasizes error reduction in the x longitude measure. In FIG. 5 the (Lateral Dilution of Precision) error volume 18 illustrates the emphasis on error reduction lateral to a horizontal axis rotated in azimuth from north such as an aircraft runway. This invention takes advantage of the error volume characterization of the various dilution of precision components.

Figure 6:
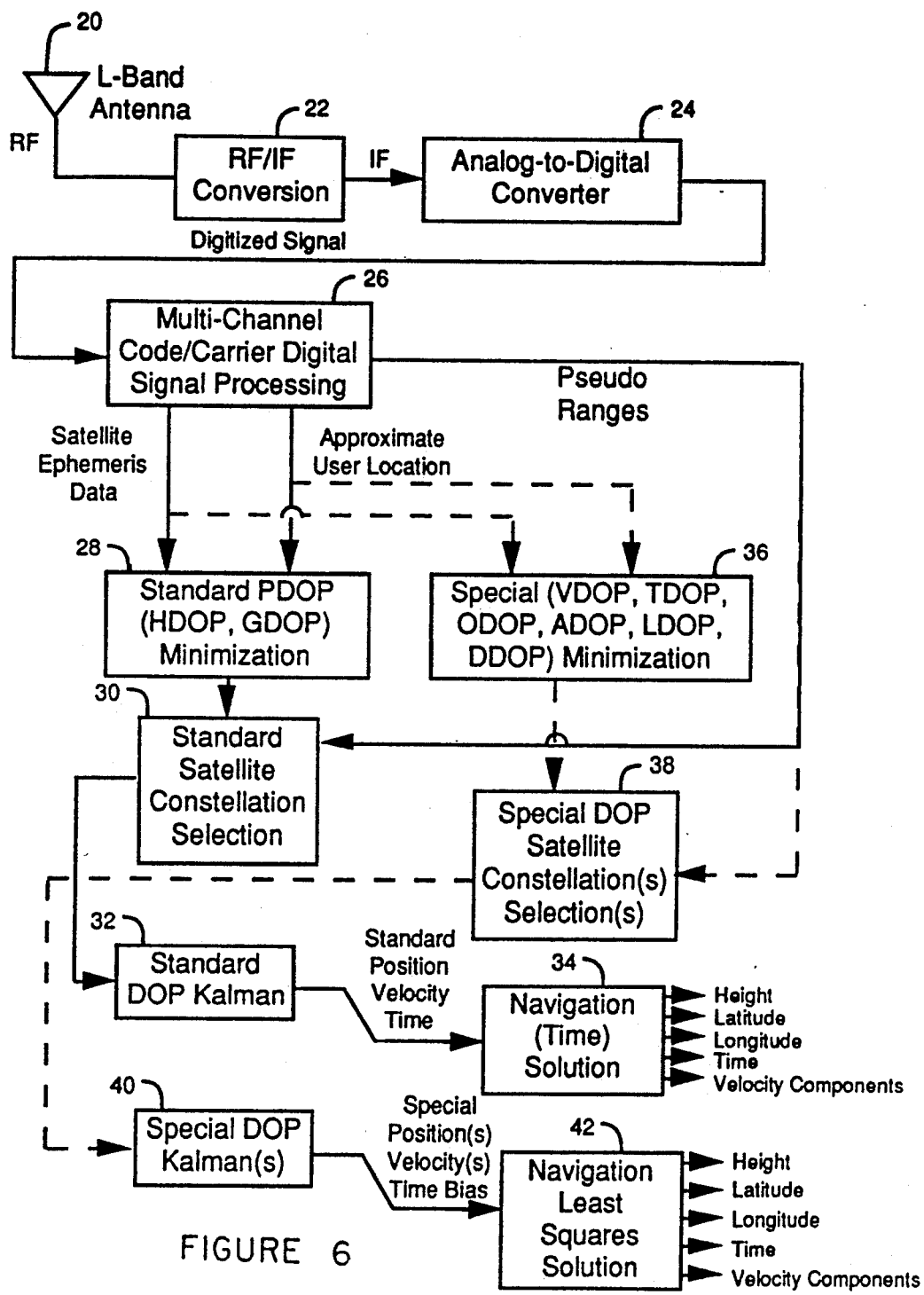
FIG. 6 is a block diagram of a typical GPS receiver as modified to include the area of processing application for this invention.

Referring to FIG. 6, a block diagram is shown which implements the novel method of the invention and takes advantage of the special DOP characterization of the error volume to reduce errors in components of position, velocity, and time. A typical GPS receiver has an L-band antenna or antennas 20 supplying RF signal to the RF/IF conversion circuitry 22 with an IF signal output that is digitized by analog-to-digital converter 24. The converter 24 is coupled to suitable multi-channel code/carrier digital signal processing circuitry 26. The digitized signal is processed by the circuitry 26 with code correlators and carrier phase lock loop, and in some receivers with code plus carrier aided processing, in the multi-channel code/carrier digital signal processing circuitry 26. The digital signal processing circuitry 26 provides the satellite ephemeris data that has been extracted from the data modulated RF/IF signal. A typical GPS receiver includes circuitry 28 which computes PDOP, HDOP, or GDOP from user-to-satellite unit vectors, for the various combinations of four (fewer with some constraints) visible satellites, and includes circuitry 28 which selects the pseudo ranges for the satellite combination with the minimum PDOP, HDOP, or GDOP value.

These selected pseudo ranges, provided as outputs of selection circuitry 30, serve as inputs to the standard DOP Kalman processing filter circuitry 32. This Kalman filter 32 is typically an eight state Kalman filter. In cases where it is integrated with an inertial system, it may be 18, 21, and 26 state filter. The Kalman filter 32 estimated outputs are formed into the navigation (time) solution designated 34 thereby providing navigation position and velocity components in the desired coordinate system, and time.

This invention modifies the typical GPS receiver in three areas. The special (VDOP, TDOP, ODOP, ADOP, LDOP, PDOP, and others) minimization processing circuitry 36 is added to input to the special DOP satellite constellation selection circuitry to select the satellite constellation(s) 38 of four satellites which will maximize the accuracy of the component(s) of interest, be it height, latitude, longitude, time, vertical velocity and others.

The output of the selection circuitry is then input to separate special DOP Kalman filter(s) 40 which then process the pseudo ranges for these special DOP selected constellation(s). The special Kalman filter(s) 40 may be, but not necessarily of the same structure as the standard DOP Kalman filter 32 for that receiver application, with different data values.

Each special DOP will have top ranked sets of four satellites selected by circuitry 38 for a rank of minimum values for that special DOP. The number of multiple sets of four satellites (three satellites with know altitude) selected for a special DOP may range from two to ten or higher. For robustness, with three or more multiple Kalman filter estimates, if a Kalman filter estimated output is beyond an allowable pre-determined error threshold from the least squares solution, that particular Kalman filter estimate is discarded, and the least squares solution is re-computed with the remaining weighted Kalman filter estimated outputs. Greater accuracy and robustness is achieved by employing more multiple constellation solutions for the navigation least squares solution circuitry 42 coupled to the special Kalman filters 40, at the expense of requiring more processing thruput and memory.

This modification of a typical GPS receiver contemplated by the invention is implemented with added processing thruput to compute the special DOP minimization by circuitry 36, selection of the satellite constellation(s) 38, the navigation least squares solution 42, and primarily for an special DOP Kalman filter(s) 40. This additional processing thruput may exist in unused capacity of the existing microprocessor. If not, another microprocessor(s) is employed for the added processing thruput.

Associated with the processing thruput, the present invention requires added memory to store data, constants, intermediate computational results, and the instructions for the special DOP algorithms. Sufficient spare memory capacity may exist in an existing microprocessor. If not, RAM memory would be added for data storage, and ROM memory for the additional instructions.

The magnitude of the added processing thruput and added memory is a function of how many of the special DOPs and how many multiple constellations for each DOP are utilized in a given application. The least is one special DOP, and the most is four special DOPs for the set of three orthogonal navigation components, and time. A matching number of special DOP Kalman filters 40 from one to four times the number of multiple constellation selections for each DOP is employed.

Referring to FIG. 7, a set of algorithms is shown for computing TDOP, VDOP and ODOP. A number of methods may be employed for computing the special DOPs. The method I use computes all the cross products of the unit vectors ($1i \times 1j$), and all the dot products ($1k \cdot (1i \times 1j)$) for all the visible satellites, and then selectively uses them to compute DOPs. The present invention does not restrict the algorithms to be used for DOP minimization to those given.

Referring to FIG. 8, the algorithm is given for an example of least squares solution of five height estimates from the five special VDOP Kalman filters. The algorithm is applied in similar form to other special DOPs.

Each Kalman estimate is weighted by the value of the inverse of the DOP for the constellation selected for that Kalman.

Obviously, other embodiments and modifications of the present invention will readily come to those of ordinary skill in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. An improved method of navigating an object using GPS (Global Positioning System) comprising:
   determining the number of GPS satellites from which the object may receive radio signals;
   selecting a first constellation of four GPS satellites from such number on the basis of minimizing the dilution of precision for a standard navigation solution;
   using the radio signals received from such constellation to compute a standard navigation solution that minimizes the dilution of precision and which includes height, latitude, longitude, time and velocity components;
   selecting at least a second constellation of four GPS satellites on the basis of minimizing the dilution of precision for a special navigation solution that includes height, latitude, longitude, time and velocity components, and
   using the radio signals selected from the second constellation in which the dilution of precision is minimized for one such component to compute a special navigation solution which includes height, latitude, longitude, time and velocity components.

2. The method defined in claim 1 wherein the second constellation is selected on the basis of minimizing the Time Dilution of Precision of the special navigation solution and thereby maximize the accuracy of the height component.

3. The method defined in claim 1 wherein the second constellation is selected on the basis of minimizing the Time Dilution of Precision of the special navigation solution and thereby maximize the accuracy of the height component.

4. The method defined in claim 1 wherein the second constellation is selected on the basis of minimizing the longitude Dilution of Precision of the special navigation solution and thereby maximize the accuracy of the longitude component.

5. The method defined in claim 1 wherein the second constellation is selected on the basis of minimizing the latitude Dilution of Precision of the special navigation solution and thereby maximize the accuracy of the latitude component.

6. The method defined in claim 1 wherein the second constellation is selected on the basis of minimizing the Directional Dilution of Precision of the special navigation solution and thereby maximize the accuracy of the directional component.

7. The method defined in claim 1 wherein the second constellation is selected on the basis of minimizing the Lateral Dilution of Precision of the special navigation solution and thereby maximize the accuracy of the lateral component.

8. An improved method of navigating an object using GPS (Global Positioning System) comprising:
   determining the number of GPS satellites from which the object may receive radio signals;
   computing the DOP (Dilution of Precision) for a general navigation solution having position, velocity, and time components and for a special navigation solution having position, velocity and time components and in which one component of the special solution is emphasized;
   ranking the computed DOP's for all combinations of satellites according to value of DOP with the minimum value of DOP being ranked highest, and
   combining the top ranked DOP's for the top ranked satellite combinations for standard and special DOP minimization, as weighted by the inverse of an associated DDOP, in a least squares solution to provide a desired navigation solution.

9. The method of claim 8 which selects a constellation of four GPS satellites on the basis of PDOP minimization to be used for a navigation solution, to be weighted by the inverse of the associated PDOP, for a least squares solution to maximize the overall accuracy of the three position components of the navigation solution.

10. The method of claim 8 which selects a constellation of four GPS satellites on the basis of GDOP minimization to be used for a navigation solution, to be weighted by the inverse of the associated GDOP, for a least squares solution to maximized the overall accuracy of the three position components and the time component of the navigation solution.

11. The method of claim 8 which selects a constellation of four GPS satellites on the basis of HDOP minimization to be used for a navigation solution, to be weighted by the inverse of the associated HDOP, for a least squares solution to maximize the overall accuracy of the two orthogonal horizontal position components of the navigation solution.

12. The method of claim 8 which selects a constellation of four GPS satellites on the basis of TDOP minimization to be used for a navigation solution, to be weighted by the inverse of the associated TDOP, for a least squares solution to maximize the overall accuracy of the time component of the navigation solution.

13. The method of claim 8 which selects a constellation of four GPS satellites on the basis of VDOP minimization to be used for a navigation solution, to be weighted by the inverse of the associated VDOP, for a least squares solution to maximize the overall accuracy of the height component.

14. The method of claim 8 which selects a constellation of four GPS satellites on the basis of ODOP minimization to be used for a navigation solution, to be weighted by the inverse of the associated ODOP, for at least squares solution to maximize the overall accuracy of the longitude component.

15. The method of claim 8 which selects a constellation of four GPS satellites on the basis of ADOP minimization to be used for a navigation solution, to be weighted by the inverse of the associated ADOP, for a least squares solution to maximize the overall accuracy of the latitude component of the navigation solution.

16. The method of claim 8 which selects a constellation of four GPS satellites on the basis of DDOP minimization to be used for a navigation solution, to be weighted by the inverse of the associated DDOP, for a least squares solution to maximize the accuracy of the directional component along a horizontal axis rotated in azimuth from North of the navigation solution.

17. The method of claim 8 which selects a constellation of four GPS satellites on the basis of LDOP minimization to be used for a navigation solution, to be weighted by the inverse of the associated LDOP, for a least squares solution to maximize the accuracy of the lateral component along a horizontal axis perpendicular to a horizontal axis rotated in azimuth from North.

18. An improved method of navigating an object using GPS and comprising the steps of:

determining the number of GPS satellites from which the object may receive radio signals;

computing the DOP's for all combinations of four satellites to maximize the accuracy of the position, velocity, and time components of interest of a navigation solution;

ranking all combinations of four satellites for each DOP of interest according to value with the minimum value ranked highest;

selecting the highest ranked values for each DOP of interest and the corresponding set of four GPS satellites for each DOP value;

obtaining the pseudo range and time for each of the four GPS satellites of each DOP value selected for each DOP of interest;

computing a separate Kalman filter navigation solution for each set of four satellites for each selected DOP value for each DOP of interest;

computing a least squares navigation solution for each DOP of interest from the previously computed navigation solution for selected values for the DOP of interest;

comparing the navigation solutions for each selected DOP value within each DOP of interest with the least squares navigation solution for the DOP of interest and rejecting those navigation solution from each selected DOP which have a solution difference in excess of a predetermined allowance, and recomputing a least squares solution for each DOP of interest in the instance of rejection of a navigation solution within that DOP of interest.

19. The method of claim 18 wherein sets of only three satellites are selected in the instance where the satellites have known altitudes.

* * * * *